US006530042B1

(12) United States Patent
Davidson et al.

(10) Patent No.: US 6,530,042 B1
(45) Date of Patent: Mar. 4, 2003

(54) METHOD AND APPARATUS FOR MONITORING THE PERFORMANCE OF INTERNAL QUEUES IN A MICROPROCESSOR

(75) Inventors: Joel Roger Davidson, Austin, TX (US); Judith E. K. Laurens, Bastrop, TX (US); Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,108

(22) Filed: Nov. 8, 1999

(51) Int. Cl.$^7$ ................................................ G06F 11/30
(52) U.S. Cl. ........................................ 714/47; 714/44
(58) Field of Search .......................... 714/47, 39, 44, 714/42; 710/18, 39

(56) References Cited

U.S. PATENT DOCUMENTS

| | | | | |
|---|---|---|---|---|
| 5,751,945 A | * | 5/1998 | Levine et al. | 714/38 |
| 5,752,062 A | * | 5/1998 | Gover et al. | 702/186 |
| 6,360,337 B1 | * | 3/2002 | Zak et al. | 713/502 |

* cited by examiner

*Primary Examiner*—Scott Baderman
(74) *Attorney, Agent, or Firm*—Duke W. Yee; Mark E. McBurney (57) ABSTRACT

A method and apparatus for monitoring an internal queue within a processor, such as an instruction completion table or instruction re-order buffer, is presented. The performance monitoring unit of the processor contains multiple counters, and each counter counts occurrences of specified events. An internal queue of the processor may be specified to be monitored. A count of event signals indicating a successful allocation request for an entry in the internal queue is divided by a count of event signals indicating a passage of units of time to obtain the average rate for allocation requests for queue entries in the specified internal queue. A count of event signals indicating an occupation of a specific entry in the internal queue during a unit of time is divided by a count of event signals indicating an allocation of a specific entry in the internal queue to obtain the average time spent in the internal queue. An average number of entries in the internal queue is computed as a product of the average rate for allocation requests for queue entries and the average time spent in the internal queue. An event signal that indicates failure of an allocation request for an entry in the internal queue may be monitored.

39 Claims, 5 Drawing Sheets

FIG. 1

| BITS 0-4 COUNTING ENABLES | BIT 5 INTERRUPT ENABLE | BITS 6-15 | BIT 16 PMC2 INTERRUPT CONTROL | BIT 17 PMC2 INTERRUPT CONTROL | BIT 18 PMC2 COUNT CONTROL | BITS 19-25 PMC1 EVENT SELECTION | BITS 26-31 PMC2 EVENT SELECTION |
|---|---|---|---|---|---|---|---|

MONITOR MODE CONTROL REGISTER (MMCR)

METHOD AND APPARATUS FOR MONITORING THE PERFORMANCE OF INTERNAL QUEUES IN A MICROPROCESSOR

BACKGROUND OF THE INVENTION

1. Technical Field

The present invention relates generally to an improved data processing system and, in particular, to a method and system for performance monitoring within a processor in a data processing system.

2. Description of Related Art

In typical computer systems utilizing processors, system developers desire optimization of software execution for more effective system design. Usually, studies are performed to determine system efficiency in a program's access patterns to memory and interaction with a system's memory hierarchy. Understanding the memory hierarchy behavior helps in developing algorithms that schedule and/or partition tasks, as well as distribute and structure data for optimizing the system.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

To assist in the analysis of the performance of a microprocessor, it would be helpful to understand the utilization of its internal resources. In particular, it would be helpful to understand the level of usage of internal data queues within the processor. These internal queues, such as the load request queue and the global completion table, i.e. the instruction re-order buffer, can cause a processor to stall when they are full. The most straightforward method for monitoring the utilization of internal queues would be to count the number of entries in the queue on every cycle and send this information to the processor's performance monitor unit for counting. Such a solution is not easy to implement since it may be difficult to count the number of entries and forward the count in a single cycle.

Therefore, it would be advantageous to have a method and apparatus for unobtrusively monitoring the utilization of internal resources within a processor, particularly the utilization of the processor's internal data queues.

SUMMARY OF THE INVENTION

A method and apparatus for monitoring an internal queue within a processor, such as an instruction completion table or instruction re-order buffer, is presented. The performance monitoring unit of the processor contains multiple counters, and each counter counts occurrences of specified events. An internal queue of the processor may be specified to be monitored. A count of event signals indicating a successful allocation request for an entry in the internal queue is divided by a count of event signals indicating a passage of units of time to obtain the average rate for allocation requests for queue entries in the specified internal queue. A count of event signals indicating an occupation of a specific entry in the internal queue during a unit of time is divided by a count of event signals indicating an allocation of a specific entry in the internal queue to obtain the average time spent in the internal queue. An average number of entries in the internal queue is computed as a product of the average rate for allocation requests for queue entries and the average time spent in the internal queue. An event signal that indicates failure of an allocation request for an entry in the internal queue may be monitored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
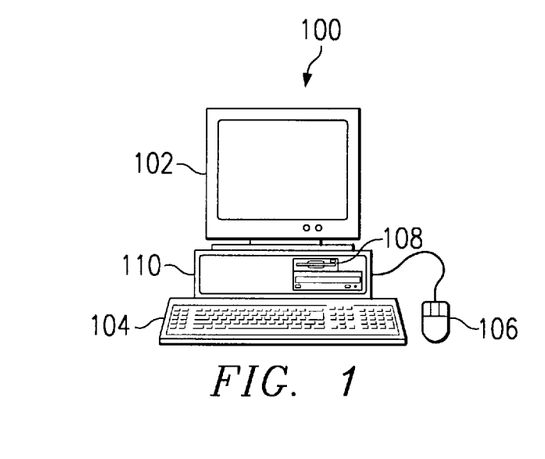
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, workstations, network computers, Internet appliances, hand-held computers, etc. System unit 110 comprises memory, a central processing unit, I/O unit, etc. However, in the present invention, system unit 110 contains a speculative processor, either as the central processing unit or as one of multiple CPUs present in the system unit.

Figure 2:
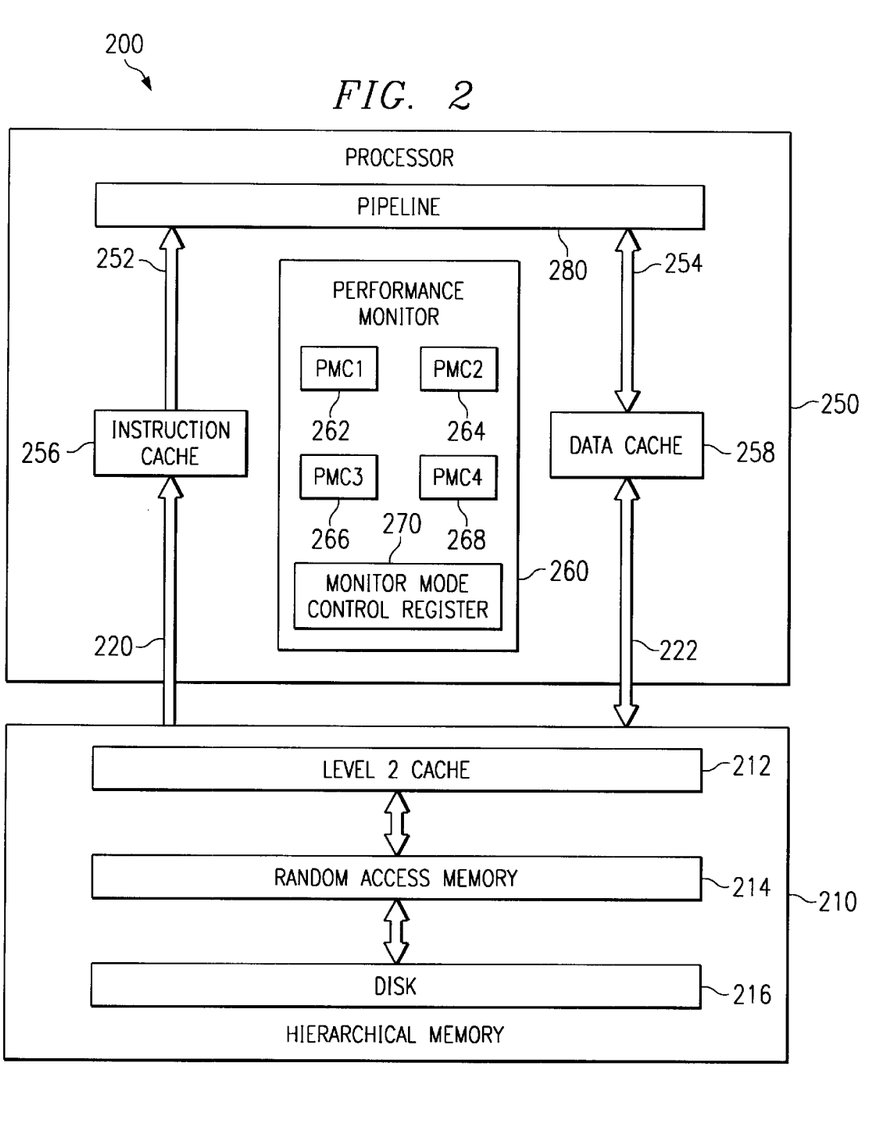
FIG. 2 is a block diagram depicting selected, internal, functional units of a data processing system for processing information in accordance with a preferred embodiment is an illustration providing an example representation of one configuration of a monitor mode control register suitable for controlling the operation of two performance monitor counters.

With reference now to FIG. 2, a block diagram depicts selected internal functional units of a data processing system for processing information in accordance with a preferred embodiment of the present invention. System 200 comprises hierarchical memory 210 and processor 250. Hierarchical memory 210 comprises Level 2 cache 212, random access memory (RAM) 214, and disk 216. Level 2 cache 212 provides a fast access cache to data and instructions that may be stored in RAM 214 in a manner which is well-known in the art. RAM 214 provides main memory storage for data and instructions that may also provide a cache for data and instructions stored on non-volatile disk 216.

Data and instructions may be transferred to processor 250 from hierarchical memory 210 on instruction transfer path 220 and data transfer path 222. Transfer path 220 and data transfer path 222 may be implemented as a single bus or as separate buses between processor 250 and hierarchical memory 210. Alternatively, a single bus may transfer data and instructions between processor 250 and hierarchical memory 210 while processor 250 provides separate instruction and data transfer paths within processor 250, such as instruction bus 252 and data bus 254.

Processor 250 also comprises instruction cache 256, data cache 258, performance monitor 260, and instruction pipeline 280. Performance monitor 260 comprises performance monitor counter (PMC1) 262, performance monitor counter (PMC2) 264, performance monitor counter (PMC3) 266, performance monitor counter (PMC4) 268, and monitor mode control register (MMCR) 270. Alternatively, processor 250 may have other counters and control registers not shown.

Processor 250 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 280 via instruction cache 256. Instruction pipeline 256 decodes and executes the instructions that have been staged within the pipeline. Some instructions transfer data to or from hierarchical memory 210 via data cache 258. Other instructions may operate on data loaded from memory or may control the flow of instructions.

Performance monitor 260 comprises event detection and control logic, including PMC1–PCM4 262–268 and MMCR 270. Performance monitor 260 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 250, and the chip area available within processor 250.

Performance monitor 260 monitors the entire system and accumulates counts of events that occur as the result of processing instructions. In the present invention, processor 250 allows instructions to execute out-of-order with respect to the order in which the instructions were coded by a programmer or were ordered during program compilation by a compiler. Processor 250 also employs speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with speculatively executed instructions in the manner provided by the present invention, the performance monitor may be used as a mechanism to monitor the performance of the processor during execution of both completed instructions and speculatively executed yet uncompleted instructions.

Figure 3:
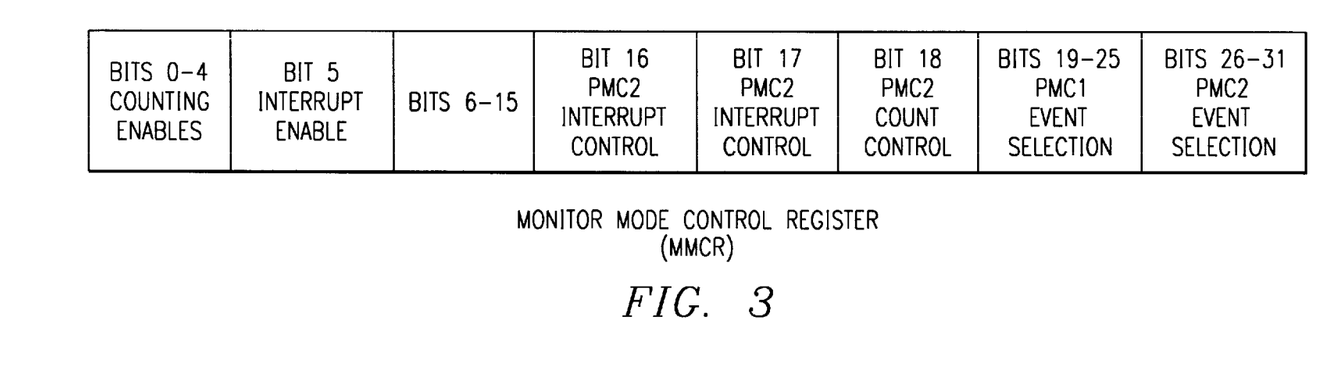
FIG. 3 is an illustration providing an example representation of one configuration of an MMCR suitable for controlling the operation of two PMCs.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization count value, which is not shown in the figures.

The initialization count value is both variable and software selectable. The initialization count value may be loaded into a counter when an instruction is first scheduled for execution. For example, given that the event under study is "register accesses", if the initialization count value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily suitable for use in identifying system performance characteristics.

Bits 0–4 and 18 of the MMCR in FIG. 3 determine the scenarios under which counting is enabled. By way of example, bit zero may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–9 may be utilized to control time or event-based transitions. Bits 19–25 may be used for event selection for PMC1, i.e. selection of signals to be counted for PMC1. The function and number of bits may be chosen as necessary for selection of events as needed within a particular implementation.

At least one counter is required to capture data for some type of performance analysis. More counters provide for faster or more accurate analysis. If the monitored scenario is strictly repeatable, the same scenario may be executed with different items being selected. If the scenario is not strictly repeatable, then the same scenario may be executed with the same item selected multiple times to collect statistical data. The time from the start of the scenario is assumed to be available via system time services so that intervals of time may be used to correlate the different signals and different events.

Figure 4:
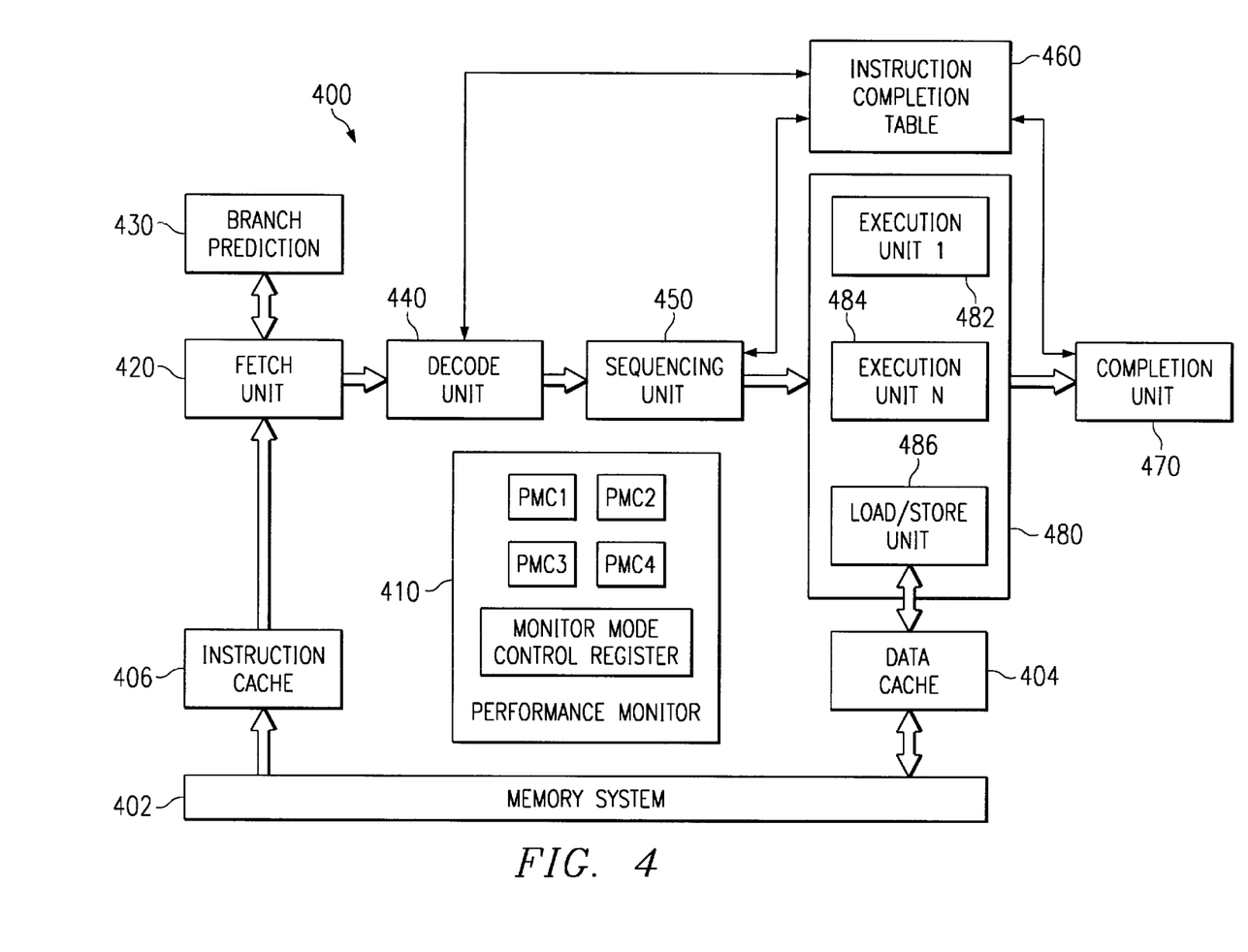
FIG. 4 is a block diagram depicting further detail of the stages of an instruction pipeline within an out-of-order, speculative execution processor.

With reference now to FIG. 4, a block diagram depicts further detail of the stages of an instruction pipeline within an out-of-order, speculative execution processor. System 400 shows memory system 402, data cache 404, instruction cache 406, and performance monitor 410, which may be similar to the hierarchical memory, data cache, instruction cache, and performance monitor shown in FIG. 3. As instructions are executed, they cause events within the processor, such as cache accesses. Performance monitor 410 contains a plurality of PMCs that count events under the control of one or more MMCRs. The counters and the MMCRs are internal processor registers and can be read or written under software control.

Fetch unit 420 retrieves instructions from instruction cache 406, which in turn retrieves instructions from memory 402. Decode unit 440 decodes instructions to determine basic information about the instruction, such as instruction type, source registers, and destination registers. Sequencing unit 450 uses the decoded information to schedule instructions for execution. In order to track instructions, completion table 460 is used for storing and retrieving information about scheduled instructions.

Out-of-order processors typically use a table to track instructions. Known as a completion buffer, a re-order buffer, or a completion table, it is a circular queue with one entry for every instruction or group of instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 sing one of the execution units 1–N, such as execution unit #1 482 or execution unit #N 484, may use load/store unit 486 to cause data to be read from or written to memory 402 via data cache 404. As instructions complete, completion unit 410 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new memory location from which to begin fetching instructions. When fetch unit 420 receives a conditional branch operation and the data upon which the condition is based is not yet available (e.g., the instruction that will produce the necessary data has not been executed), fetch unit 420 may use one or more branch prediction mechanisms in branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 5:
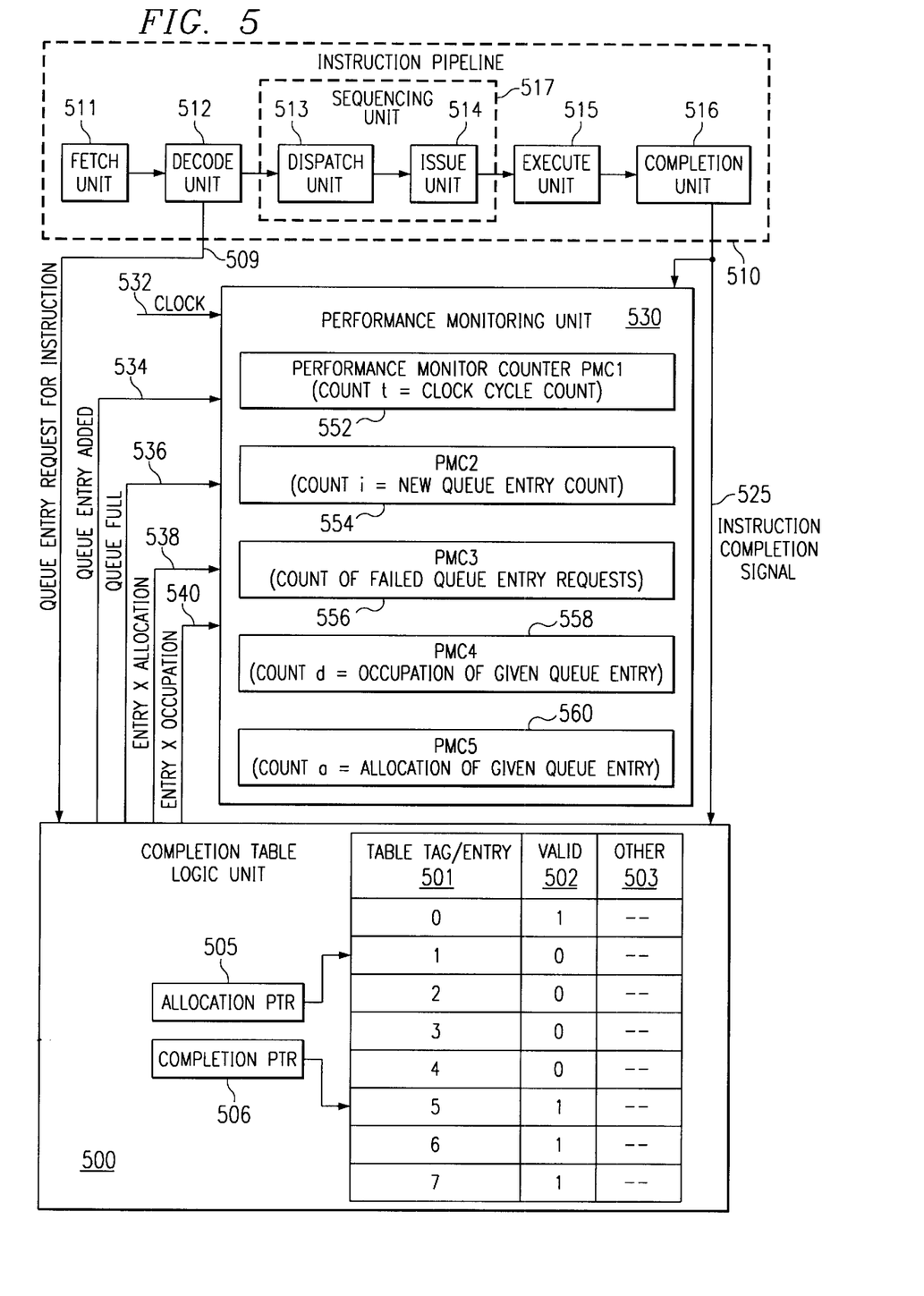
FIG. 5 is a diagram illustrating a performance monitor that monitors the performance of an internal queue in accordance with a preferred embodiment of the present invention.

With reference now to FIG. 5, a diagram illustrates a performance monitor that monitors the performance of an internal queue in accordance with a preferred embodiment of the present invention. Completion table logic unit 500 contains an instruction completion table that is organized as a circular list with each entry in the completion table tracking a single instruction. An instruction is said to have a "tag value" equal to its index value or entry number in the completion table. Table tag/entry 501 may or may not be stored within the completion table. The tag value allows a unit within the processor to associate identified events with a particular instruction. For example, an instruction completion unit may use the tag value of the instruction whose execution is being completed to identify the completing instruction. By identifying the completing instruction, the completion table entry for the completing instruction may then be updated to indicate that the completion table entry may be reused.

Valid flag or bit 502 in the instruction completion table identifies those instructions within the instruction completion table that have not yet completed their execution. Other information associated with an instruction within the instruction completion table may be stored in the completion table, for example, in a field such as "other" 503.

Allocation pointer 505 holds the index of the next available entry in the instruction completion table. Completion pointer 506 holds the index of the oldest instruction in the instruction completion table or the index of the next instruction that is expected to complete its processing. If no completion table entries are available, then the sequencing unit of the processor stalls until an entry is available.

FIG. 5 shows exemplary data within the instruction completion table in which the completion pointer points to entry 5 and the allocation pointer points to entry 1. The instruction in entry 5 is the instruction which is expected to complete its processing next. Instructions in entries 0 and 5–7 may be waiting to execute, currently executing, or waiting to complete as indicated by their Valid flags. The next instruction to be decoded will be allocated entry 1 and the allocation pointer will increment to point to entry 2. If the allocation pointer points to entry 7 and another entry needs to be allocated, then the allocation pointer wraps to entry 0 in a circular fashion. In this example, if the allocation pointer pointed to entry 5, no more entries would be available. It should be noted that the instructions within the instruction completion table do not necessarily execute in the order in which they were placed in the completion table. Instructions are inserted into the completion table in the order that they are coded by the programmer, i.e. they are placed in the table in program-order. Instructions may execute out of order, but they must complete in the order that they entered into the completion table.

Alternatively, a single completion table entry may be allocated for a group of instructions. All of the instructions within the group may then be tracked with a single tag value.

Instruction pipeline 510 contains stages of an instruction pipeline similar to those shown in FIG. 4. Units 511–516 depict individual stages of an instruction pipeline. Fetch unit 511 fetches instructions from memory, and decode unit 512 decodes the instructions to determine the type of instruction, its operands, and the destination of its result. Dispatch unit 513 requests operands for an instruction, and issue unit 514 determines that an instruction may proceed with execution. Execute unit 515 performs the operation on the operands as indicated by the type of instruction. Completion unit 516 deallocates any internal processor resources such as the commitment of registers, that were required by the instruction. As instructions complete, completion unit 516 provides an instruction completion signal 525 that may be used by completion table logic unit 500 to deallocate the completion table entry of the completing instruction given its instruction or table tag. Depending upon system implementation, an instruction pipeline may have more or less stages. For example, the functions of dispatch unit 513 and issue unit 514 may be performed by a single unit, such as a scheduling unit or sequencing unit 517.

The number of performance monitor counters may vary depending upon the size of the performance monitor implemented within a processor. With sufficient counters, the performance monitor may be configured to monitor a variety of tasks simultaneously, such as both the progress of instructions through the instruction pipeline and the utilization of internal queues.

During a heavy processing load, a processor can stall waiting for space in one of its internal queues. Hence, it is important to be able to monitor the utilization of the internal queues. Rather than counting the number of entries in the queue on every cycle and sending this information to the processor's performance monitor for counting, the present invention uses the performance monitor counters to collect enough information to derive the average number of entries in an internal queue without having to physically count each entry. With sufficient information, the average number of entries in a queue can be calculated and other critical data can be directly measured.

When a queue, such as the completion table shown in FIG. 5, is managed in a circular fashion, i.e. entries 1 through N are utilized in order and then the system wraps back to 1, the average number of entries in the queue can be estimated using Little's Law, a well known queuing theory principle. To derive the average number of entries in a queuing system (L) requires that the average time spent in the system (W) be known as well as the arrival rate at which new requests enter the system ($\lambda$). Using Little's Law, the average number of entries in the system is L=$\lambda$W. To implement this in a microprocessor requires the following:

1) A performance monitor or Performance Monitoring Unit (PMU) capable of receiving event signals and counting them;
2) An event signal indicating that a unit of time has passed, such as a processor clock—called count "t";
3) An event signal that indicates a new request has been added to the internal queue being monitored, which is used to derive the arrival rate—called count "i";
4) An event signal that indicates when a new request could not be added to the queue because the queue was full;
5) An event signal that indicates when a given position in the queue is occupied, which is used to derive the time spent in the system—called count "d" (only one position in the queue needs to be instrumented since each position in the queue is assumed to be equivalent);
6) An event signal that indicates the instrumented slot has been allocated, which is used along with the occupied signal to calculate the average time a queue position is occupied—called count "a"; and
7) From these counts, it is possible to calculate:

$$W=d/a;$$

$$\lambda=i/t;$$

and applying Little's Law:

$$L=\lambda W.$$

The number of cycles when the queue is full, and hence not able to accept an entry at the average arrival rate, is measured directly.

Referring again to FIG. 5, clock 532 is input into performance monitoring unit 530 to count a number of clock cycles in order to determine a monitoring period. Alternatively, a different signal may be used to indicate the passage of units of time.

Performance monitoring unit 530 also accepts a variety of signals from completion table logic unit 500, and each of the received signals may be routed to a performance monitor counter as individual events. Although these signals are described with respect to the instruction completion table, similar signals may be used for similar types of internal queues within the processor, such as the load request queue. The performance monitor may also receive other signals related to events within the processor, such as instruction completion signal 525.

Queue entry added signal 534 provides an indication of an allocation of any entry in the instruction completion table. This type of signal may be generated from, or may be identical to, a signal that increments allocation pointer 505. Queue full signal 536 provides an indication of a failure to add a queue entry upon a queue entry request for an instruction into the instruction completion table. This type of signal may be generated when it is detected that allocation pointer 505 and completion pointer 506 point to the same entry in the instruction completion table, thereby indicating that the instruction completion table is full.

In order to track the utilization of an internal queue, the utilization of a specific entry in the queue is tracked to provide information to be used in calculating the average utilization of the queue as a whole. A specific entry may be used, but FIG. 5 shows a generic entry X that represents a specific entry, such as entry 0. Entry X allocation signal 538 provides an indication of the allocation of entry X in the instruction completion table. This type of signal may be generated via the setting of a Valid bit for entry X in the instruction completion table that is being allocated. Entry X occupation signal 540 provides an indication that entry X in the instruction completion table is currently occupied during an instruction cycle. This type of signal may be generated as being equal to the Valid bit for entry X in the instruction completion table.

Performance monitoring unit 530 may be configured through appropriate values in its monitor mode control registers so that the queue-related signals, such as signals 534–540 from completion table logic unit 500, are routed for counting by the performance monitor counters. Performance monitoring unit 530 may be configured to be able to monitor one or more of a plurality of internal queues. In the example provided in FIG. 5, the instruction completion table has been previously specified as an internal queue to be monitored, and the performance monitor counters are configured as follows: PMC1 552 may count the number of clock cycles (count t); PMC2 554 may count the number of new queue entries (count i); PMC3 556 may count the number of failed queue entry requests; PMC4 558 may count the number of instruction cycles in which a given queue entry is occupied (count d); PMC5 560 may count the number of allocations for a given queue entry (count a).

The values in the performance monitor counters at the end of the monitoring period may be read through software control to compute the performance of the internal, monitored queue and reported in a variety of manners.

Figure 6:
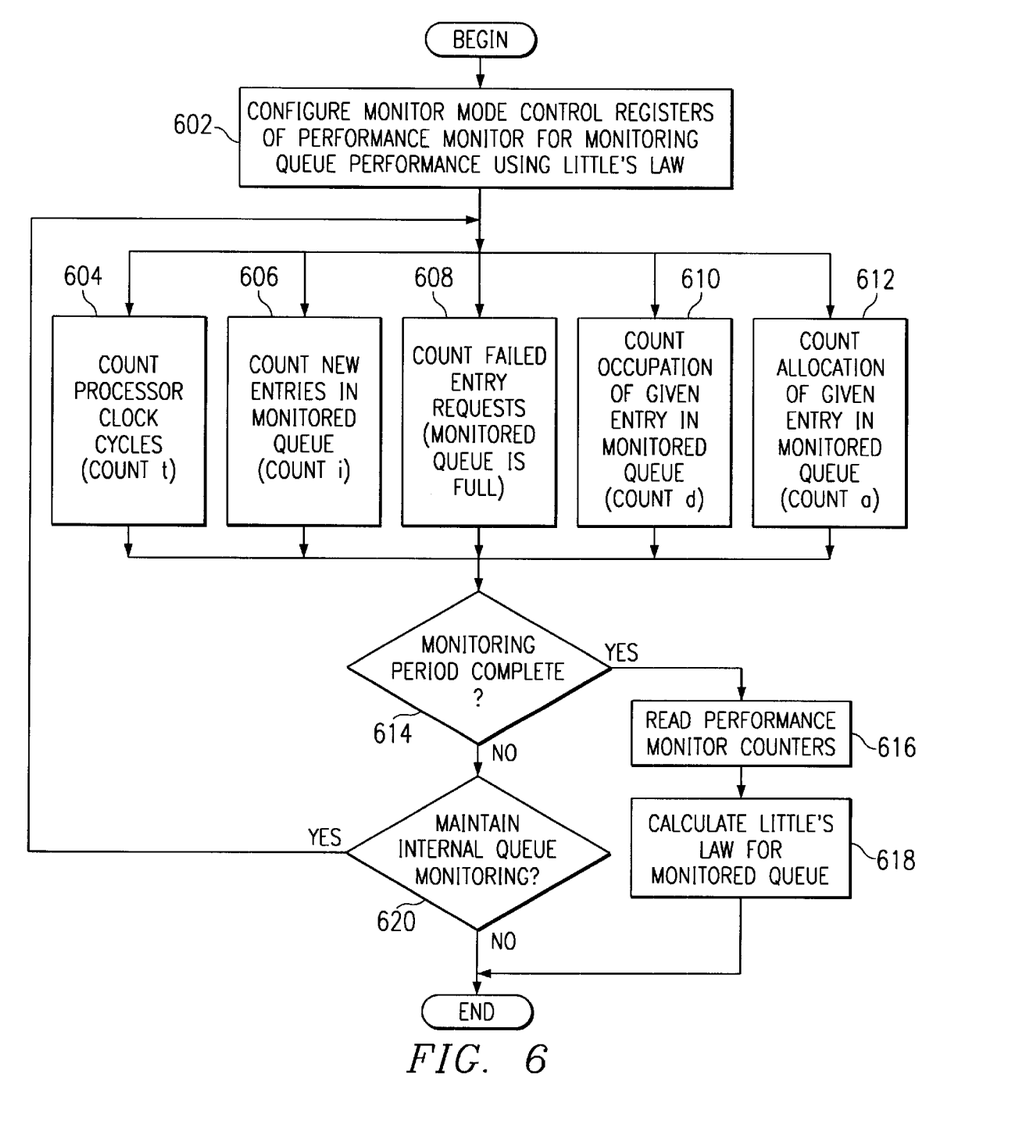
FIG. 6 is a flowchart depicting a process for monitoring the performance of an internal queue in accordance with a preferred embodiment of the present invention.

With reference now to FIG. 6, a flowchart depicts a process for monitoring the performance of an internal queue in accordance with a preferred embodiment of the present invention. The process begins when the monitor mode control registers of the performance monitor are configured for monitoring the performance of the internal queue in accordance with the variables necessary for calculating Little's Law (step 602).

During the monitoring period, several event signals may be counted simultaneously. The processor clock cycles may be counted (step 604) while the new entries added to the monitored queue are counted (step 606). In addition, failed entry requests are also counted (step 608), and a count is made of the number of instruction cycles in which a given entry in the queue is occupied (step 610). While these counts are being made, a count is also made of the number of allocations of a given entry in the queue (step 612).

A determination is then made as to whether the monitoring period. is complete (step 614). If so, the performance monitor counters are read (step 616), and a calculation is performed using Little's Law for the performance of the monitored queue (step 618). The process is then complete with respect to computing a numerical value to represent queue performance.

If the monitoring period is not complete, then a determination is made as to whether the internal queue should continue being monitored (step 620). If so, a branch is made in order to continue monitoring the queue by counting queue-related events. In this manner, the performance monitor continues looping until the monitoring period is complete or the performance monitor counters are reconfigured for a different monitoring task.

The advantages provided by the present invention should be apparent in light of the detailed description of the invention provided above. The present invention uses a performance monitor to count signals that may be used in conjunction with the maintenance of a queue. The signals may be used to compute a utilization factor of a queue without attempting to count all entries on every cycles. By monitoring the average use of a particular entry in the queue over a given period of time, the performance monitor may be configured to count events that provide enough information to compute the average use of the whole queue over the same period of time.

It is important to note that while the present invention has been described in the context of a fully functioning data processing system, those of ordinary skill in the art will appreciate that the processes of the present invention are capable of being distributed in the form of a computer readable medium of instructions, including microcode, and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring an internal queue within a processor using a plurality of counters, wherein each counter among the plurality of counters counts occurrences of specified events, the method comprising:

specifying an internal queue of the processor to be monitored;

monitoring events associated with utilization of the internal queue; and computing an average utilization of the internal queue based on the monitored events.

2. The method of claim 1 wherein the specified internal queue is a global completion table or instruction re-order buffer.

3. The method of claim 1 wherein the specified internal queue is a load request queue.

4. The method of claim 1 wherein the step of monitoring events associated with utilization of the internal queue further comprises:

monitoring an event signal that indicates failure of an allocation request for an entry in the internal queue.

5. The method of claim 1 wherein the step of monitoring events associated with utilization of the internal queue further comprises:

monitoring an event signal indicating a passage of units of time;

monitoring an event signal that indicates a successful allocation request for an entry in the internal queue;

monitoring an event signal that indicates an occupation of a specific entry in the internal queue during a unit of time; and monitoring an event signal that indicates an allocation of a specific entry in the internal queue.

6. The method of claim 5 wherein the event signal indicating the passage of units of time is the processor clock signal.

7. The method of claim 5 wherein each event signal is monitored by counting each assertion of each event signal using the plurality of counters.

8. The method of claim 1 wherein the step of computing an average utilization of the internal queue based on the monitored events further comprises:

computing an average rate for allocation requests for queue entries;

computing an average time spent in the internal queue;

computing an average number of entries in the internal queue as a product of the average rate for allocation requests for queue entries and the average time spent in the internal queue.

9. The method of claim 1, wherein the average utilization is computed without requiring counting of all entries in the internal queue on every cycle.

10. A method of monitoring an internal queue within a processor using a plurality of counters, wherein each counter among the plurality of counters counts occurrences of specified events, the method comprising:

specifying an internal queue of the processor to be monitored;

monitoring events associated with utilization of the internal queue;

computing an average utilization of the internal queue based on the monitored events, wherein computing the average utilization includes;

computing an average rate for allocation requests for queue entries by dividing a count of event signals indicating a successful allocation request for an entry in the internal queue by a count of event signals indicating a passage of units of time to obtain the average rate for allocation requests for queue entries;

computing an average time spent in the internal queue; and computing an average number of entries in the internal queue as a product of the average rate for allocation requests for queue entries and the average time spent in the internal queue.

11. A method of monitoring an internal queue within a processor using a plurality of counters, wherein each counter among the plurality of counters counts occurrences of specified events and wherein the step of computing an average utilization of the internal queue based on the monitored events, the method comprising:

specifying an internal queue of the processor to be monitored;

monitoring events associated with utilization of the internal queue;

computing an average utilization of the internal queue based on the monitored events, wherein computing the average utilization includes;

computing an average rate for allocation requests for queue entries;

computing an average time spent in the internal queue by dividing a count of event signals indicating an occupation of a specific entry in the internal queue during a unit of time by a count of event signals indicating an allocation of a specific entry in the internal queue to obtain the average time spent in the internal queue; and computing an average number of entries in the internal queue as a product of the average rate for allocation requests for queue entries and the average time spent in the internal queue.

12. An apparatus of monitoring an internal queue within a processor, the apparatus comprising a plurality of counters, wherein each counter among the plurality of counters counts occurrences of specified events, the apparatus comprising:

specifying means for specifying an internal queue of the processor to be monitored;

first monitoring means for monitoring events associated with utilization of the internal queue; and first computing means for computing an average utilization of the internal queue based on the monitored events.

13. The apparatus of claim 12 wherein the specified internal queue is a global completion table or instruction re-order buffer.

14. The apparatus of claim 12 wherein the specified internal queue is a load request queue.

15. The apparatus of claim 12 further comprising:

second monitoring means for monitoring an event signal that indicates failure of an allocation request for an entry in the internal queue.

16. The apparatus of claim 12 further comprising:

third monitoring means for monitoring an event signal indicating a passage of units of time;

fourth monitoring means for monitoring an event signal that indicates a successful allocation request for an entry in the internal queue;

fifth monitoring means for monitoring an event signal that indicates an occupation of a specific entry in the internal queue,during a unit of time; and sixth monitoring means for monitoring an event signal that indicates an allocation of a specific entry in the internal queue.

17. The apparatus of claim 16 wherein the event signal indicating the passage of units of time is the processor clock signal.

18. The apparatus of claim 16 wherein each event signal is monitored by counting each assertion of each event signal using the plurality of counters.

19. The apparatus of claim 12 further comprising:

second computing means for computing an average rate for allocation requests for queue entries;

third computing means for computing an average time spent in the internal queue;

fourth computing means for computing an average number of entries in the internal queue as a product of the average rate for allocation requests for queue entries and the average time spent in the internal queue.

20. An apparatus of monitoring an internal queue within a processor, the apparatus comprising a plurality of counters, wherein each counter among the plurality of counters counts occurrences of specified events, the apparatus comprising:

specifying means for specifying an internal queue of the processor to be monitored;

first monitoring means for monitoring events associated with utilization of the internal queue;

first computing means for computing an average utilization of the internal queue based on the monitored events first sub-means for computing an average rate for allocation requests for queue entries by dividing a count of event signals indicating a successful allocation request for an entry in the internal queue by a count of event signals indicating a passage of units of time to obtain the average rate for allocation requests for queue entries;

second sub-means for computing an average time spent in the internal queue; and third sub-means for computing an average number of entries in the internal queue as a product of the average rate for allocation requests for queue entries and the average time spent in the internal queue.

21. An apparatus of monitoring an internal queue within a processor, the apparatus comprising a plurality of counters, wherein each counter among the plurality of counters counts occurrences of specified events, the apparatus comprising:

specifying means for specifying an internal queue of the processor to be monitored;

first monitoring means for monitoring events associated with utilization of the internal queue;

first computing means for computing an average utilization of the internal queue based on the monitored events;

first sub-means for computing an average rate for allocation requests for queue entries;

second sub-means for computing an average time spent in the internal queue by dividing a count of event signals indicating an occupation of a specific entry in the internal queue during a unit of time by a count of event signals indicating an allocation of a specific entry in the internal queue to obtain the average time spent in the internal queue; and third sub-means for computing an average number of entries in the internal queue as a product of the average rate for allocation requests for queue entries and the average time spent in the internal queue.

22. A computer program product in a computer-readable medium for use in a data processing system for monitoring an internal queue within a processor using a plurality of counters, wherein each counter among the plurality of counters counts occurrences of specified events, the computer program product comprising:

instructions for specifying an internal queue of the processor to be monitored;

instructions for monitoring events associated with utilization of the internal queue; and instructions for computing an average utilization of the internal queue based on the monitored events.

23. The computer program product of claim 22 wherein the specified internal queue is a global completion table or instruction re-order buffer.

24. The computer program product of claim 22 wherein the specified internal queue is a load request queue.

25. The computer program product of claim 22 wherein the instructions for monitoring events associated with utilization of the internal queue further comprises:

instructions for monitoring an event signal that indicates failure of an allocation request for an entry in the internal queue.

26. The computer program product of claim 22 wherein the instructions for monitoring events associated with utilization of the internal queue further comprises:

instructions for monitoring an event signal indicating a passage of units of time;

instructions for monitoring an event signal that indicates a successful allocation request for an entry in the internal queue;

instructions for monitoring an event signal that indicates an occupation of a specific entry in the internal queue during a unit of time; and instructions for monitoring an event signal that indicates an allocation of a specific entry in the internal queue.

27. The computer program product of claim 26 wherein the event signal indicating the passage of units of time is the processor clock signal.

28. The computer program product of claim 26 wherein each event signal is monitored by counting each assertion of each event signal using the plurality of counters.

29. The computer program product of claim 22 wherein the instructions for computing an average utilization of the internal queue based on the monitored events further comprises:

instructions for computing an average rate for allocation requests for queue entries;

instructions for computing an average time spent in the internal queue;

instructions for computing an average number of entries in the internal queue as a product of the average rate for allocation requests for queue entries and the average time spent in the internal queue.

30. A computer program product in a computer-readable medium for use in a data processing system for monitoring an internal queue within a processor using a plurality of counters, wherein each counter among the plurality of counters counts occurrences of specified events, the computer program product comprising:

first instructions for specifying an internal queue of the processor to be monitored;

second instructions for monitoring events associated with utilization of the internal queue;

third instructions for computing an average utilization of the internal queue based on the monitored events;

first sub-instructions for computing an average rate for allocation requests for queue entries;

second sub-instructions for computing an average time spent in the internal queue;

third sub-instructions for computing an average number of entries in the internal queue as a product of the average rate for allocation requests for queue entries and the average time spent in the internal queue; and fourth sub-instructions for dividing a count of event signals indicating a successful allocation request for an entry in the internal queue by a count of event signals indicating a passage of units of time to obtain the average rate for allocation requests for queue entries.

31. A computer program product in a computer-readable medium for use in a data processing system for monitoring an internal queue within a processor using a plurality of counters, wherein each counter among the plurality of counters counts occurrences of specified events, the computer program product comprising:

first instructions for specifying an internal queue of the processor to be monitored;

second instructions for monitoring events associated with utilization of the internal queue;

third instructions for computing an average utilization of the internal queue based on the monitored events;

first sub-instructions for computing an average rate for allocation requests for queue entries;

second sub-instructions for computing an average time spent in the internal queue by dividing a count of event signals indicating an occupation of a specific entry in the internal queue during a unit of time by a count of event signals indicating an allocation of a specific entry in the internal queue to obtain the average time spent in the internal queue; and third sub-instructions for computing an average number of entries in the internal queue as a product of the average rate for allocation requests for queue entries and the average time spent in the internal queue.

32. A method of monitoring an internal queue within a processor using a plurality of counters, wherein each counter among the plurality of counters counts occurrences of specified events, the method comprising:

specifying an internal queue of the processor to be monitored;

monitoring events associated with utilization of the internal queue to form monitored queue events;

collecting sufficient information from the monitored queue events to derive an average number of entries in the internal queue to form collected information; and computing an average utilization of the internal queue using the collected information.

33. The method of claim 32 wherein the specified internal queue is a global completion table or instruction re-order buffer.

34. The method of claim 32 wherein the specified internal queue is a load request queue.

35. The method of claim 32 wherein the step of monitoring events associated with utilization of the internal queue further comprises:

monitoring an event signal that indicates failure of an allocation request for an entry in the internal queue.

36. The method of claim 32 wherein the step of monitoring events associated with utilization of the internal queue further comprises:

monitoring an event signal indicating a passage of units of time;

monitoring an event signal that indicates a successful allocation request for an entry in the internal queue;

monitoring an event signal that indicates an occupation of a specific entry in the internal queue during a unit of time; and monitoring an event signal that indicates an allocation of a specific entry in the internal queue.

37. The method of claim 32 wherein the step of computing an average utilization of the internal queue based on the monitored events further comprises:

computing an average rate for allocation requests for queue entries;

computing an average time spent in the internal queue; and computing an average number of entries in the internal queue as a product of the average rate for allocation requests for queue entries and the average time spent in the internal queue.

38. The method of claim 32, wherein the average utilization is computed without requiring counting of all entries in the internal queue on every cycle.

39. A data processing system of monitoring an internal queue within a processor using a plurality of counters, wherein each counter among the plurality of counters counts occurrences of specified events, the data processing system comprising:

specifying means for specifying an internal queue of the processor to be monitored;

monitoring means for monitoring events associated with utilization of the internal queue to form monitored queue events;

collecting means for collecting sufficient information from the monitored queue events to derive an average number of entries in the internal queue to form collected information; and computing means for computing an average utilization of the internal queue using the collected information.

* * * * *

UNITED STATES PATENT AND TRADEMARK OFFICE
CERTIFICATE OF CORRECTION

PATENT NO. : 6,530,042 B1
DATED : March 4, 2003
INVENTOR(S) : Davidson et al.

It is certified that error appears in the above-identified patent and that said Letters Patent is hereby corrected as shown below:

<u>Column 12,</u>
Line 33, after "queue", delete ",".

Signed and Sealed this

Twenty-sixth Day of August, 2003

JAMES E. ROGAN
*Director of the United States Patent and Trademark Office*